United States Patent [19]

Tominaga

[11] Patent Number: 5,006,238

[45] Date of Patent: Apr. 9, 1991

[54] FILTER FOR USE IN A FISH CULTURING TANK

[75] Inventor: Kazutoshi Tominaga, Higashiosakashi, Japan

[73] Assignee: Kabushiki Kaisha Tominaga Jyushi Kogyosho, Osaka, Japan

[21] Appl. No.: 368,578

[22] Filed: Jun. 20, 1989

[51] Int. Cl.$^5$ .............................................. E04H 3/16
[52] U.S. Cl. .................. 210/169; 210/416.2; 210/484; 210/232
[58] Field of Search ...................... 210/169, 416.2, 484, 210/232

[56] References Cited

U.S. PATENT DOCUMENTS 3,160,588 12/1964 Alarie .................................. 210/169
3,561,604 2/1971 Yotsumoto ......................... 210/484
3,744,635 7/1973 Horvath ............................... 210/169

*Primary Examiner*—Peter Hruskoci
*Assistant Examiner*—Robert A. Simpson
*Attorney, Agent, or Firm*—Collard, Roe & Galgano

[57] ABSTRACT

A filter adapted for use in a fish culturing tank, the filter including a filter casing, a pump mounted on top of the casing, and an attachment interposed between the casing and the pump which has an inlet portion extending in the casing through the attachment to suck the filtered water therein and an outlet portion for returning the filtered water to the tank, the attachment having a first means for allowing the inlet portion of the pump to pass through, and a second means for connection to the casing.

3 Claims, 2 Drawing Sheets

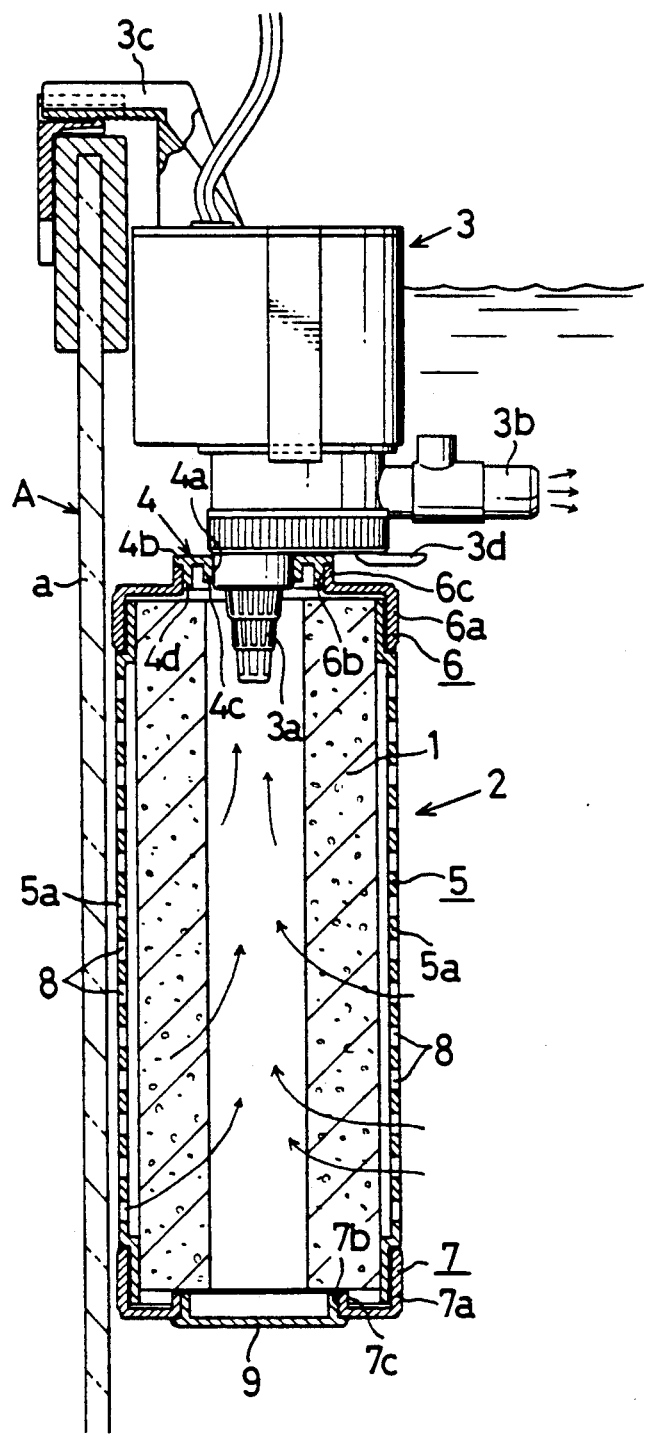
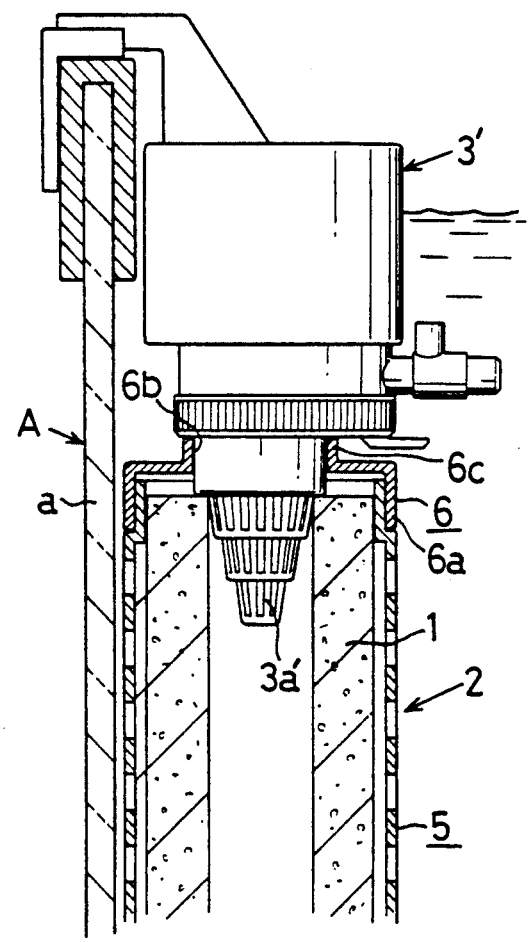
FIG. 2
FIG. 3

FILTER FOR USE IN A FISH CULTURING TANK

BACKGROUND OF THE INVENTION

The present invention relates to a filter for use in a tank designed to culture fish such as tropical fish and gold fish for ornamental or fancy aquariums.

Tanks of such a kind employ various types of filters for maintaining a clean water in the culturing tanks. There is a common structure to the known filters which includes a cylindrical casing containing a filter medium and an electric pump mounted on top of the casing. The filter is attached on the inside wall of the culturing tank.

The casing and the pump are detachably connected to each other by inserting a water sucking nozzle of the pump in an aperture of the casing in a watertight manner.

However, the disadvantage of such known filters is that they have no dimensional flexibility. For example, if the pump is replaced with a larger one, the filter must be replaced with a new one having a larger casing for connection to the larger pump. Likewise, if the casing is replaced with a larger one to accommodate more filter medium, the pump must be replaced with a larger one for connection to the larger casing. In this way the replacement of either pump or casing requires that of the filter per se. This is uneconomical and wasteful.

Accordingly, an object of the present invention is to provide a filter which has a dimensional flexibility, thereby adapting itself for variations in the size of the tank.

Other objects and advantages of the present invention will become more apparent from the following detailed description, when taken in conjunction with the accompanying drawings which show, for the purpose of illustration only, one embodiment in accordance with the present invention.

SUMMARY OF THE INVENTION

These objects are achieved by providing a filter which comprises a casing containing a filter medium, a pump mounted on top of the casing, and an attachment interposed between the casing and the pump, the pump comprising an inlet portion extending in the casing through the attachment so as to suck the water in the casing through the filter medium and an outlet portion for supplying the sucked water to the tank, the attachment comprising a first means for allowing the inlet portion of the pump to pass through, and a second means, at the opposite side of the first means, for connection to the casing.

When the pump is to be replaced with a larger one, without replacing the casing, the attachment has only to be removed to insert the inlet portion of the larger pump directly in the casing.

If several attachments having first means of different sizes are prepared, a pump selected from those of various sizes can be equipped at hand to match with the size of the tank. If several attachment having second means of different sizes are prepared, a casing selected from those of various sizes can be employed to accommodate a desired amount of filter medium.

BRIEF DESCRIPTION OF THE DRAWINGS

FIG. 2 is a cross-sectional view showing the filter of FIG. 1 in operation; and, FIG. 3 is a cross-sectional view showing the pump directly connected to the casing without the interposition of the attachment.

DETAILED DESCRIPTION OF THE PREFERRED EMBODIMENTS

Figure 1:
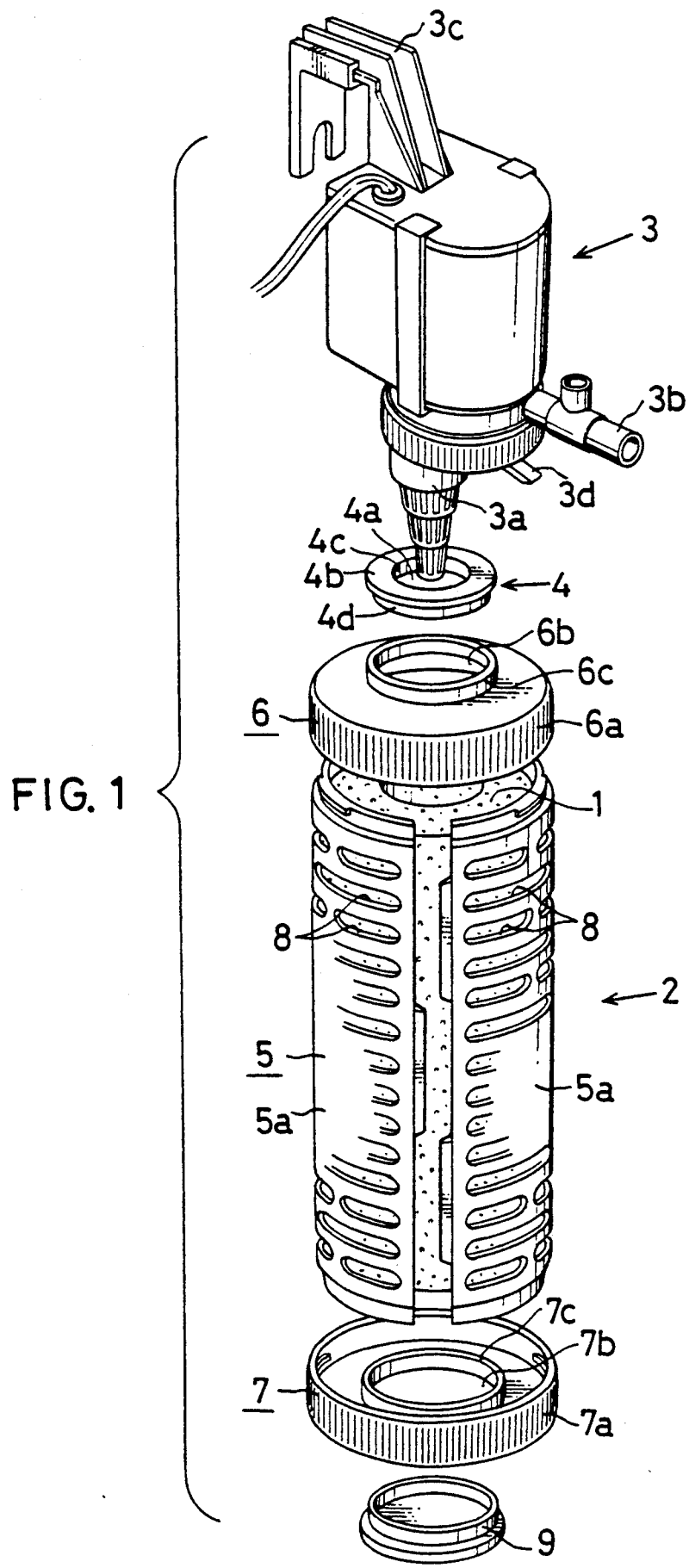
FIG. 1 is an exploded perspective view showing a filter according to the present invention.

FIG. 1 shows an example of the filter of the present invention which includes a casing 2 containing a cylindrical filter medium 1, an electric pump 3 mounted on top of the casing 2, with the interposition of an attachment 4.

The casing 2 includes a cylindrical body 5 having an upper open end and a lower open end which are respectively closed by caps 6 and 7. The cylindrical body 5 is dividable into halved members 5a made of hard plastics. The halved members 5a have a number of slits 8 in their wall through which the filthy water in the tank (A) is sucked into the casing 2 by the pump 3. The sucked water is filtered by the filter medium 1. The upper cap 6 of hard plastics covers the upper open end of the cylindrical body 5 in such a manner that the fringe 6a of the cap 6 completely covers the seam between the cap 6 and the cylindrical body 5. The cap 6 has an aperture 6b in the center around which a rim 6c is erected. The lower cap 7 of hard plastics covers the lower open end of the cylindrical body 5 in such a manner that the fringe 7a of the cap 7 completely covers the seam between the cap 7 and the cylindrical body 5. The cap 7 has an aperture 7b in the center around which a rim 7c is erected. The aperture 7b is normally closed by a plug 9.

Where necessary, a second casing of the same structure as the casing 2 can be connected to the lower cap 7 by inserting the rim 6c of the second casing in the aperture 7b of the first casing 2.

The pump 3 is watertightly constructed to be operated in the water. The pump 3 is provided with a water inlet portion in the form of a sucking nozzle 3a extending downward, and a water outlet portion in the form of a water exhausting nozzle 3b extending sideways. The pump 3 pumps up a filtered water from the casing 2, and supplies it to the tank (A) through the exhausting nozzle 3b. In this way the filthy water in the tank (A) is returned thereto after it is filtered. The pump 3 is attached to a side wall (a) of the tank (A) by means of a hanger 3c at the top thereof. The rate of water to be sucked is regulated by rotating a lever 3d.

The attachment 4 is a one piece member molded with plastics, having a flange portion 4b and a shank portion 4d. The flange 4b has a bore 4a defined by a side wall 4c, the bore 4a allowing the water sucking nozzle 3a of the pump 3 to pass through. The shank portion 4d watertightly fits in the aperture 6b of the upper cap 6. In this way the pump 3 is connected to the casing 2 through the attachment 4. as shown in FIG. 2. Then the filter is hung on the side wall (a) of the tank (A).

FIG. 3 shows a modified version of the embodiment in which the attachment 4 is omitted and a different pump 3' having a larger water sucking nozzle 3a' is directly attached to the casing 2. A variety of attachments can be prepared at a relatively low cost, which have apertures 4a of different sizes so as to enable pumps having sucking nozzles of various sizes to be mounted on the same casing 2.

It is also possible to use casings 2 having apertures 6b of various sizes with respect to the same pump 3 if the attachments having shank portions 4d of various sizes are used.

What is claimed is:

1. A filter for use in a fish culturing tank comprising:
   a generally vertically-disposed, slotted outer cylindrical casing containing a cylindrical filter medium and having a top open end and a bottom open end, said casing also having a pair of removable caps, an upper cap associated with said top open end, and a lower cap associated with said bottom open end, each of which has an aperture formed therethrough, said upper cap additionally having a raised rim surrounding said aperture thereof and said lower cap having a plug removably mounted in said aperture thereof, so that said aperture is normally closed;
   a watertightly-constructed electric pump having a downwardly depending inlet nozzle for drawing filtered water from said casing and an outlet nozzle for returning water to the tank;
   an interchangeable attachment means for removably mounting said pump directly atop said top end of said casing with said inlet nozzle extending into said casing, said attachment means comprising a generally annular collar having a generally horizontally-disposed flange portion having a downwardly depending outer shank portion which is configured and dimensioned to sealingly mate with said raised rim of said upper cap and a downwardly depending inner shank portion, radially-inwardly spaced from said outer shank portion, which defines a central bore which is configured and dimensioned to allow said inlet nozzle to pass therethrough; and
   means for removably mounting said filter inside said tank.

2. The filter of claim 1, wherein said attachment means comprises a one-piece plastic member.

3. The filter of claim 1, wherein said casing comprises removably-interlocking halved-members.

* * * * *